Patented Apr. 18, 1933

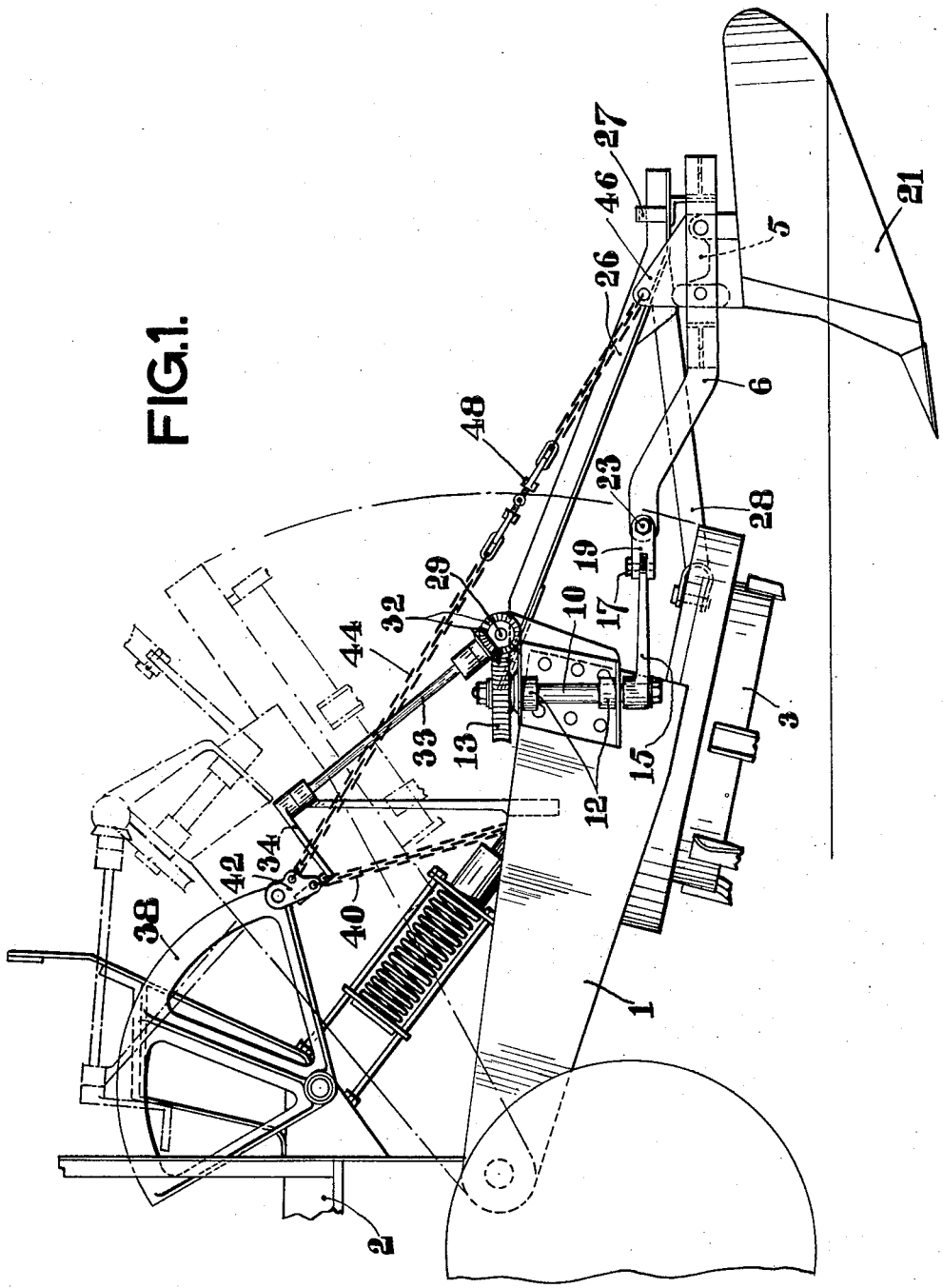

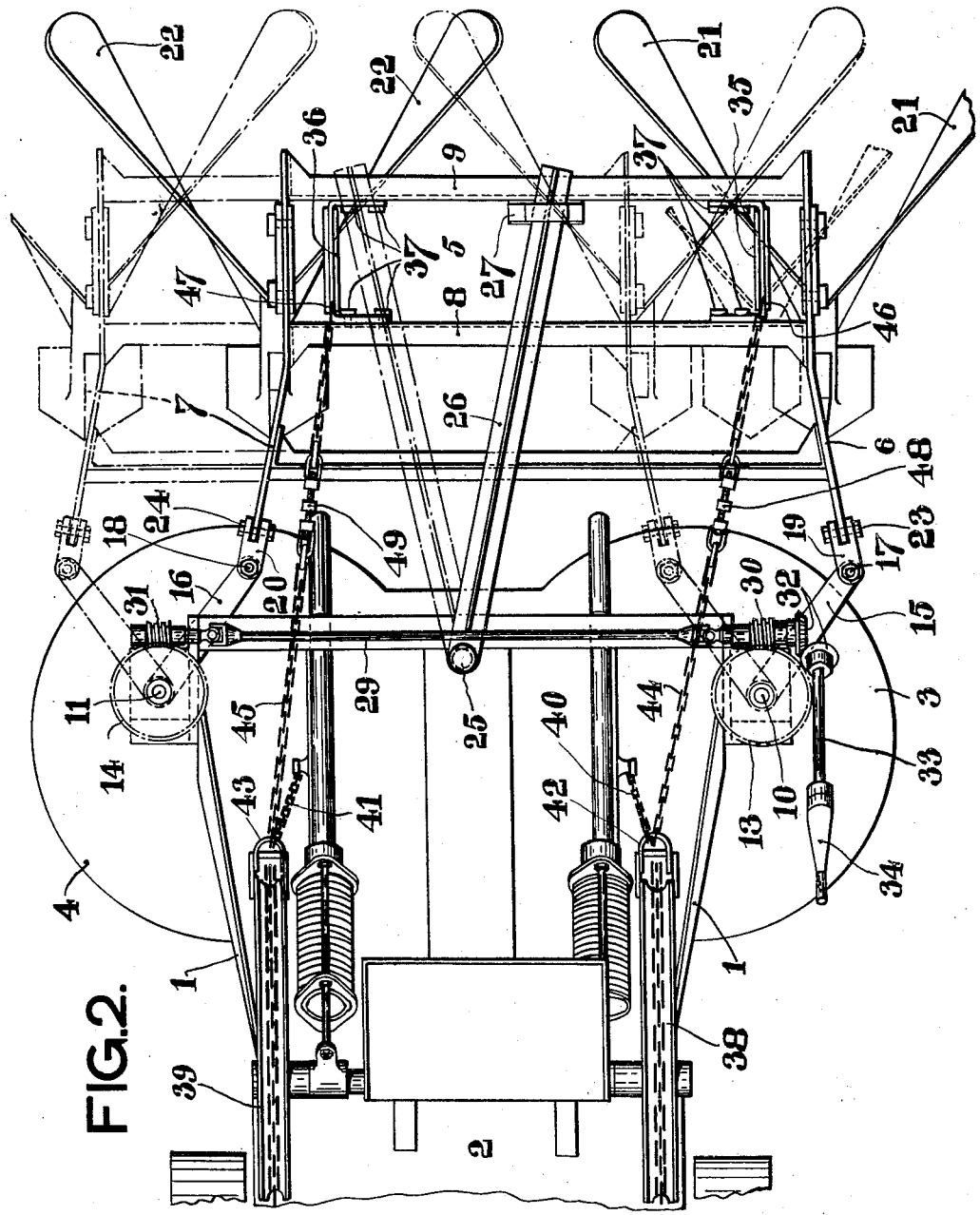

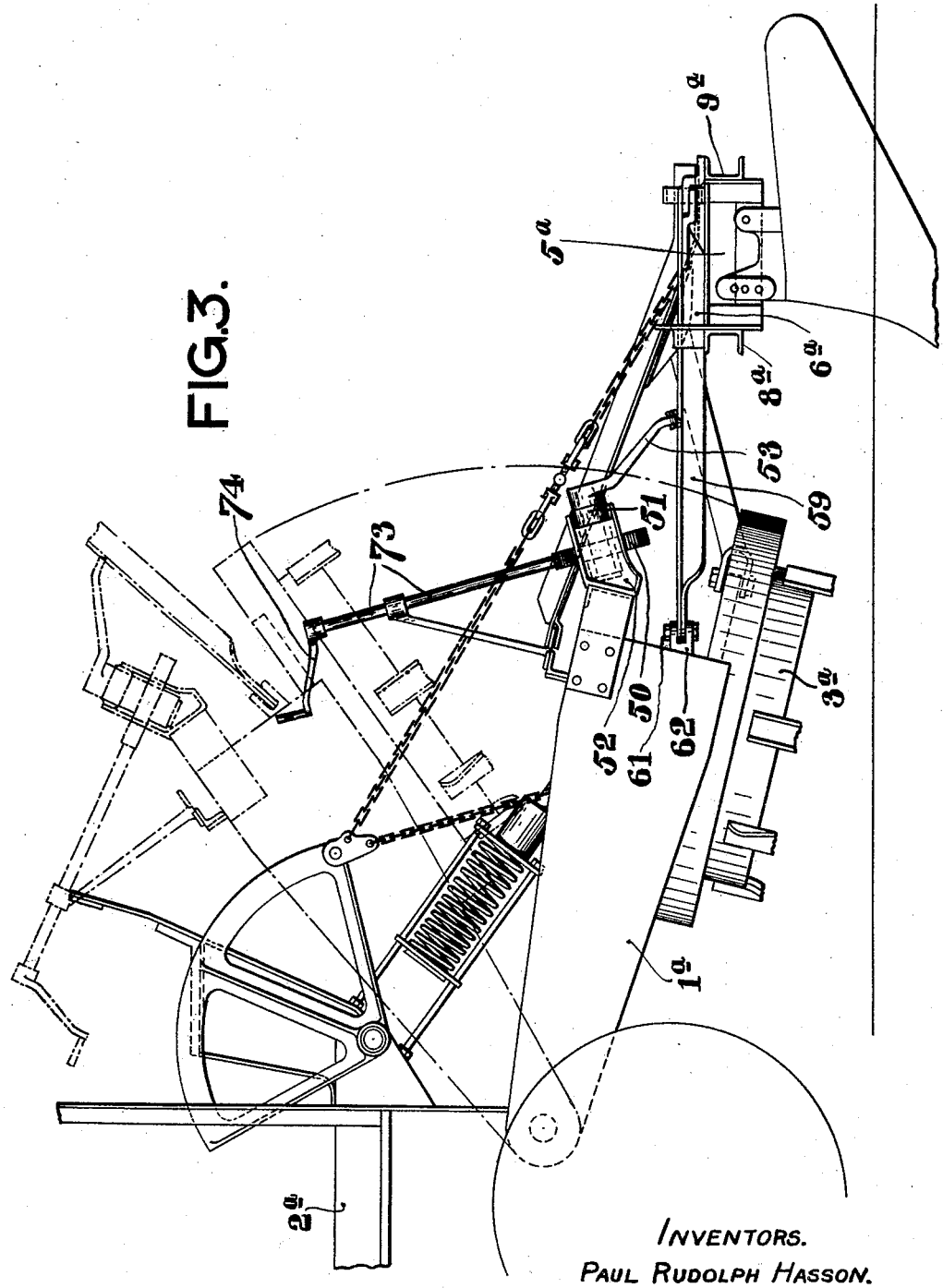

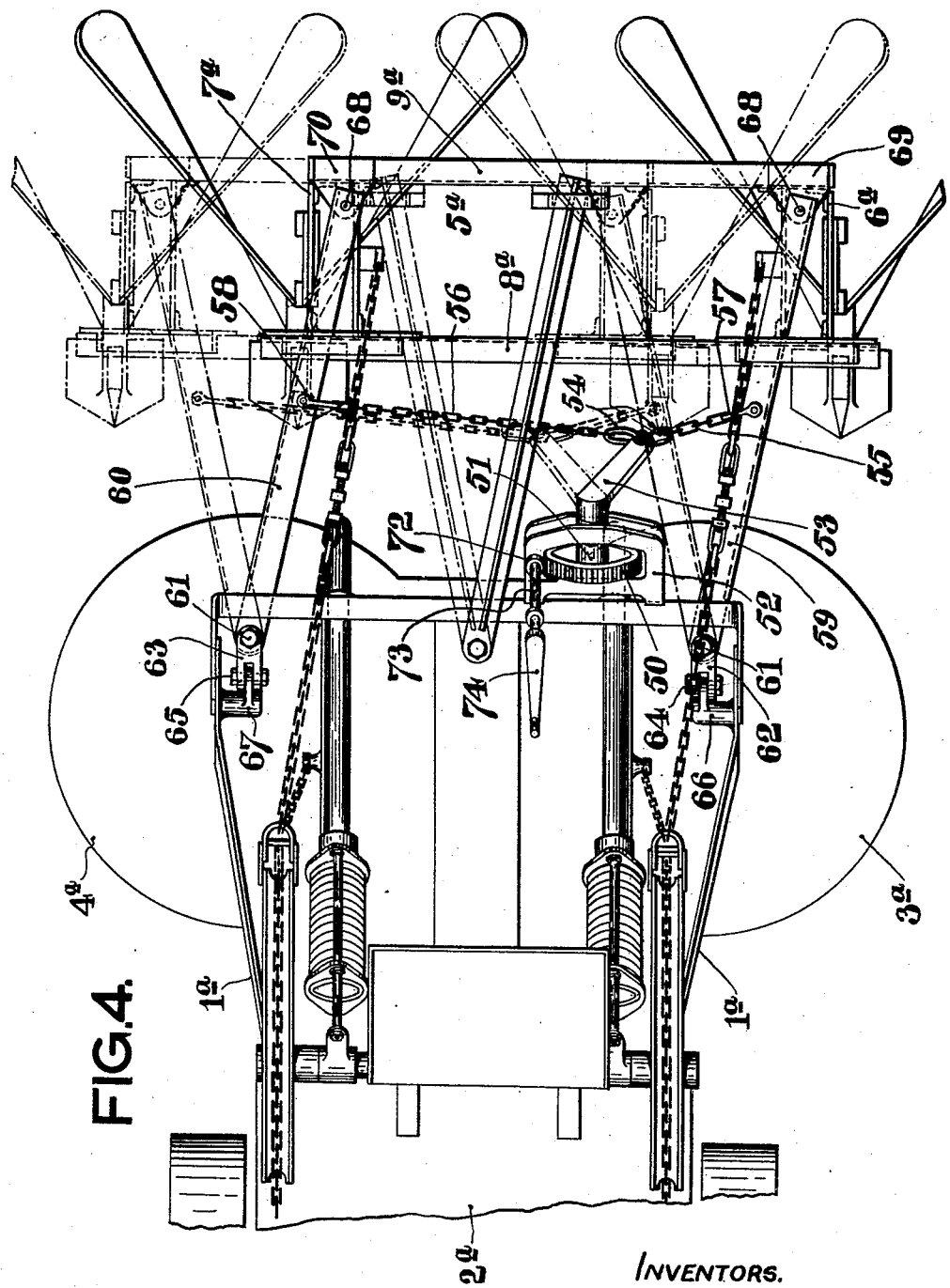

1,904,138

UNITED STATES PATENT OFFICE

PAUL RUDOLPH HASSON AND EDWARD DARWENT ELLIS, OF LEEDS, ENGLAND, ASSIGNORS TO JOHN FOWLER & CO., (LEEDS) LTD., OF LEEDS, ENGLAND

RIDGING IMPLEMENT ON ROTARY TILLING MACHINES

Application filed August 13, 1931, Serial No. 556,900, and in Great Britain March 28, 1931.

This invention relates to tilling machines of the type known as rotary tillers in which rotating diggers or tilling instruments having their axes substantially approximating to the vertical are drawn through the soil by a suitable tractor construction, on which they are mounted, the rotating tillers being followed by plough-like trenching implements usually two in number, acting as spreaders or ridgers, side by side, at a distance apart.

The present invention consists of an improvement or modification of the invention of Charles Henry Fowler for which he applied for Letters Patent Serial No. 438,794 dated 25th March, 1930.

The purpose of the present invention is to provide an improved construction for the adjustment of these spreaders or ridgers to the right or left as regards the medial line of movement of the tilling machine thus allowing the tracks of the machine to run on untilled land irrespective of the distance apart of the ridging bodies, and maintain furrows at regular intervals in the tilled land, also allowing the ridges to retain a predetermined direction should there be any slight deviation from that direction by the tractor.

The invention comprises features of construction intended for the fulfilment of the above and other purposes as hereinafter described and more particularly pointed out in the claims.

Reference being made to the annexed drawings in which:—

Fig. 1 is a diagrammatic side elevation showing so much of the tilling machine as is necessary for the explanation of the present improvement.

Fig. 2 is a plan view illustrating the improved means for moving the ridging implements towards the right or left of the medial tilling line while the tractor is moving or turning.

Figs. 3 and 4 show in side elevation and plan respectively a modified form of construction.

Referring firstly to Figs. 1 and 2:—attachable to the trailing portion 1 of the tractor 2 which carries the rotatory tillers 3 and 4, is a rectangular frame 5 comprising longitudinal side members 6, 7 and transverse parallel members 8, 9.

Mounted on shafts 10, 11, carried in bearings 12, one on each side of the trailing portion 1, are two worm wheels 13, 14, the axes of which are substantially vertical.

To the shafts 10, 11 are attached arms 15, 16 respectively which are pivotally connected by vertical bolts 17, 18 to one end of fork members 19, 20. The ends 6, 7 of the frame 5 carrying the ridging implements 21, 22 are pivotally connected by horizontal bolts 23, 24 to the other ends of the forks 19, 20 whereby relative vertical and lateral movement of the frame 5 is possible.

Pivotally attached at 25 to the trailing portion 1 is a bar 26 which engages loosely in an eye 27 formed on the member 9 of the frame 5, and this bar may be supported also by a strut 28 suitably attached to the trailing portion 1. A transverse shaft 29 mounted on the trailing portion 1 carries worms 30, 31 which engage the worm wheels 13, 14. Bevel gear 32 connects the shaft 29 with a shaft 33 carrying a handle 34. The shaft 33 is of a length sufficient to bring the handle 34 conveniently within reach of the driver when the tilling and ridging implements have been raised from the soil as hereinafter described. By this construction the ridging implements 21, 22 are carried by a free floating frame which can be readily adjusted by manipulation of the handle 34 to cause the ridging implements to trail in lines which are offset respectively more or less as desired to the right or left as regards the medial line of travel of the machine.

The ridging implements 21, 22 may be attached to the side members 6, 7 of the frame 5. Or at or near opposite ends of the frame 5 are slidably adjustable members 35, 36 movable longitudinally of the frame and therefore, transversely of the line of traction of the tilling machine, to which members 35, 36 the ridging implements 21, 22 may be respectively connected. The members 35, 36 may be severally fixed in position on the frame 5, as for example by bolts 37 passing through selected holes of a series of holes provided in the transverse members 8, 9 of the frame 5, and may thus serve for the adjustment of the two ridging implements 21, 22 as regards their distance apart from one another.

In tillers of the character to which this invention is applied the trailing portion 1 carrying the rotatory tilling implements 3, 4 is mounted so that it can be lifted clear of the ground when desired, as for example by two sectors 38, 39 and chains 40, 41 (one of which sectors and chains is shown in Fig. 1, the other being immediately behind it).

The chains 40, 41 are connected to eyes 42, 43 pivotally attached to one end of the sectors 38, 39.

Further chains 44, 45 are attached to lugs 46, 47 on the frame 5 and to the eyes 42, 43 of the sectors 38, 39 respectively.

The chains 44, 45 are adjustable as to length by draw links 48, 49.

It will thus be obvious that when the tilting implements are lifted from the ground by movement of the sectors 38, 39, the ridging implements will also be raised.

In the modified form of construction shown in Figs. 3 and 4, the rectangular frame $5^a$ $6^a$ $7^a$ having side members $5^a$ $6^a$ $7^a$ and transverse parallel members $8^a$ $9^a$ is attached to the trailing portion $1^a$ of the tractor $2^a$ which latter carries the rotatory tilting implements $3^a$ and $4^a$ and is of similar construction to that already described.

In place of providing two worm wheels as described with reference to Figs. 1 and 2, one worm wheel 50 is used, mounted on a shaft 51 carried in a bearing 52 on the trailing portion $1^a$.

To the shaft 51 is fixed an arm 53 provided at its end with pivoted eyes 54 to which one end of chains 55, 56 are connected. The other ends of the chains 55, 56 are connected as by pivoted eyes 57, 58 to rocking arm 59, 60. The rocking arm 59, 60 are pivoted by vertical bolts 61 to fork members 62, 63 pivoted by horizontal bolts 64, 65 to lugs 66, 67 carried on the trailing portion $1^a$, while the other ends of said arms 59, 60 are pivotally connected as at 68 to lugs 69, 70 on the member $9^a$ of the frame $5^a$.

The frame $5^a$ is thus adapted to form a parallel movement which may be swung more or less as desired to the right or left with respect to the medial line of travel of the machine. In this construction the worm 72 for operating the worm wheel 50 is mounted on a shaft 73 journalled in the bearing 52 and carries a handle 74 and which as in the former case is of such length that when the tilling and ridging implements are raised from the soil, the handle rises to within convenient reach of the driver of the machine.

The method of mounting the ridging implements and the means for raising the tilling and ridging implements from the soil may be similar to those described with reference to Figs. 1 and 2 and therefore no further description of these features is considered necessary.

What we claim as our invention and desire to secure by Letters Patent of the United States is:—

1. In a tilling machine comprising ground working implements adapted to loosen the soil, the combination of a tilling machine frame, a trailing frame attached to the tilling machine frame, shafts carried on said machine frame, worm wheels mounted on said shafts, arms attached to said shafts and pivotally connected to said trailing frame, ridging implements attached to said trailing frame, and means extended to proximity of the driver's seat to rotate said worm wheels and adjust the trailing frame to cause the ridging implements to trail in lines having adjustable offset as regards the medial line of travel of the machine.

2. In a tilling machine comprising ground working implements adapted to loosen the soil, the combination of a tilling machine frame, a trailing frame attached to the tilling machine frame, bearings on the sides of the machine frame, shafts journalled in said bearings, the axes of which are substantially vertical, worm wheels mounted on said shafts, arms attached to said shafts and pivotally connected to said trailing frame, ridging implements attached to said trailing frame, a transverse shaft mounted on the machine frame, worms on said transverse shaft engaging said worm wheels, and means extended to proximity of the driver's seat to rotate said transverse shaft, worms, and worm wheels in order to adjust the trailing frame to cause the ridging implements to trail in lines which are adjustably offset as regards the medial line of travel of the machine.

3. In a tilling machine comprising ground working implements adapted to loosen the soil, the combination of a tilling machine frame, a trailing frame attached to the tilling machine frame, bearings on the sides of the machine frame, shafts journalled in said bearings, the axes of which are substantially vertical, worm wheels mounted on said shafts, arms attached to said shafts and pivotally connected to said trailing frame, ridging implements attached to said trailing frame, a transverse shaft mounted on the machine frame, worms on said transverse shaft engaging said worm wheels, a further shaft extending to proximity of the driver's seat, a handle to rotate said shaft, and bevelled gear to connect said transverse shaft to said further shaft in order to adjust the trailing frame to cause the ridging implements to trail in lines which are adjustably offset as regards the medial line of travel of the machine.

4. In a tilling machine comprising ground working implements adapted to loosen the soil, the combination of a tilling machine frame, a transverse frame attached to the tilling machine frame, bearings on the sides of the machine frame, shafts journalled in said bearings, the axes of which are substantially vertical, worm wheels mounted on said shafts, arms attached to said shafts and pivotally connected to said transverse frame, members adjustable to and from each other on said frame, ridging implements attached to said members, a transverse shaft mounted on the machine frame, worms on said transverse shaft engaging said worm wheels, a further shaft extending to proximity of the driver's seat, a handle to rotate said shaft, and bevelled gear to connect said transverse shaft to said further shaft in order to adjust the transverse frame to cause the ridging implements to trail in lines which are adjustably offset as regards the medial line of travel of the machine.

5. In a tilling machine comprising ground working implements adapted to loosen the soil, the combination of a tilling machine frame, a trailing frame attached to the tilling machine frame, bearings on the sides of the machine frame, shafts journalled in said bearings, the axes of which are substantially vertical, worm wheels mounted on said shaft, arms attached to said shafts and pivotally connected to said trailing frame, members adjustable to and from each other on said frame, ridging implements attached to said members, a transverse shaft mounted on the machine frame, worms on said transverse shaft engaging said worm wheels, a further shaft extending to proximity of the driver's seat, a handle to rotate said shaft, bevelled gear to connect said transverse shaft to said further shaft in order to adjust the trailing frame to cause the ridging implements to trail in lines which are adjustably offset as regards the medial line of travel of the machine, and means for swinging the trailing frame in a direction to and from the soil.

6. In a tilling machine comprising ground working implements adapted to loosen the soil, the combination of a tilling machine frame, a trailing frame attached to the tilling machine frame, a shaft carried on said machine frame, a worm wheel on said shaft, an arm attached to said shaft, rocking arms pivoted to the machine frame and the trailing frame, members connecting said arm to said rocking arms, ridging implements attached to said trailing frame, and means extended to proximity of the driver's seat to rotate said worm wheel in order to adjust the trailing frame to cause the ridging implements to trail in lines which are adjustably offset as regards the medial line of travel of the machine.

7. In a tilling machine comprising ground working implements adapted to loosen the soil, the combination of a tilling machine frame, a transverse frame attached to the tilling machine frame, a bearing on the machine frame, a shaft journalled in said bearing, a worm wheel on said shaft, an arm attached to said shaft, two rocking arms pivoted to the machine frame and the transverse frame, chains connecting said arm to said rocking arms, ridging implements attached to said transverse frame, a further shaft journalled in said bearing and extending to proximity of the driver's seat, a handle on said further shaft, and a worm on said further shaft operating said worm wheel to adjust the transverse frame in order to cause the ridging implements to trail in lines which are adjustably offset as regards the medial line of travel of the machine.

8. In a tilling machine comprising ground working implements adapted to loosen the soil, the combination of a tilling machine frame, a transverse frame attached to the tilling machine frame, a bearing on the machine frame, a shaft journalled in said bearing, a worm wheel on said shaft, an arm attached to said shaft, two rocking arms pivoted to the machine frame and the transverse frame, chains connecting said arm to said rocking arms, members adjustable to and from each other on said frame, ridging implements attached to said members, a further shaft journalled in said bearing and extending to proximity of the driver's seat, a handle on said further shaft, and a worm on said further shaft operating said worm wheel to adjust the transverse frame in order to cause the ridging implements to trail in lines which are adjustably offset as regards the medial line of travel of the machine.

9. In a tilling machine comprising ground working implements adapted to loosen the soil, the combination of a tilling machine frame, a transverse frame attached to the tilling machine frame, a bearing on the machine frame, a shaft journalled in said bearing, a worm wheel on said shaft, an arm attached to said shaft, two rocking arms pivoted to the machine frame and the transverse frame, chains connecting said arm to said rocking arms, members adjustable to and from each other on said frame, ridging implements attached to said members, a further shaft journalled in said bearing and extending to proximity of the driver's seat, a handle on said further shaft, a worm on said further shaft operating said worm wheel to adjust the transverse frame in order to cause the ridging implements to trail in lines which are adjustably offset as regards the medial line of travel of the machine, and means for swinging the transverse frame in a direction to and from the soil.

10. In a tilling machine the combination with a tilling machine frame and rotatory diggers having their axes approximately vertical, mounted on said tilling machine frame, of a transverse frame attached to the tilling machine frame rearwardly of said diggers so as to have movement transversely of the medial line of travel of the machine, ridging implements attached to said transverse frame, and means extended to proximity of the driver's seat for lateral adjustment of said transverse frame so as to hold the ridging implements at a variable position of offset with respect to tracks of the diggers.

11. In a tilling machine the combination of a tilling machine frame and rotatory diggers having axes approximately vertical mounted on said tilling machine frame, a transverse frame attached to the tilling machine frame so as to have movement transversely of the medial line of travel of the machine, members adjustable to and from each other on said transverse frame, ridging implements attached to said members, and means extended to proximity of the driver's seat for lateral adjustments of said transverse frame so as to hold the ridging implements at a variable position of offset with respect to tracks of the diggers.

12. In a tilling machine, the combination with the tilling machine frame and rotatory diggers having axes approximately vertical mounted on said tilling machine frame, of a transverse frame attached to the tilling machine frame so as to have floating movement transversely of the medial line of travel of the machine, ridging implements attached to said transverse frame, means extended to proximity of the driver's seat for lateral adjustment of said transverse frame so as to hold the ridging implements at a variable position of offset with respect to tracks of the diggers, and means for swinging the transverse frame in a direction to and from the soil.

13. In a tilling machine comprising ground working implements adapted to loosen the soil, the combination with the tilling machine frame, of a transverse frame attached to the tilling machine frame so as to have movement transversely of the medial line of travel of the machine, ridging implements attached to said frame, means for lateral adjustment of said transverse frame, the said means comprising arms adapted to swing transversely, connections from said arms to said transverse frame, worm gear for operating said arms, and means extended to proximity of the driver's seat for operating said worm gear.

14. In a tilling machine comprising ground working implements adapted to loosen the soil, the combination with the tilling machine frame, of a transverse frame attached to the tilling machine frame so as to have movement transversely of the medial line of travel of the machine, ridging implements attached to said frame, means for lateral adjustment of said transverse frame, the said means comprising arms adapted to swing transversely, connections from said arms to said transverse frame, worm gear for operating said arms, means extended to proximity of the driver's seat for operating said worm gear, and means for swinging the transverse frame in a direction to and from the soil.

15. In a tilling machine comprising ground working implements adapted to loosen the soil, the combination of a tilling machine frame, a transverse frame attached to the tilling machine frame so as to have movement transversely of the medial line of travel of the machine, members adjustable to and from each other on said frame, ridging implements attached to said members, means for lateral adjustment of said transverse frame, the said means comprising arms adapted to swing transversely, connections from said arms to said transverse frame, worm gear for operating said arms, and means extended to proximity of the driver's seat for operating said worm gear.

16. In a tilling machine comprising ground working implements adapted to loosen the soil, the combination with the tilling machine frame, of a transverse frame attached to the tilling machine frame so as to have movement transversely of the medial line of travel of the machine, ridging implements attached to said frame, means for lateral adjustment of said transverse frame, the said means comprising arms adapted to swing transversely, connections from said arms to said transverse frame, worm gear for operating said arms, means extended to proximity of the driver's seat for operating said worm gear, and means for swinging the transverse frame in a direction to and from the soil.

PAUL RUDOLPH HASSON.
EDWARD DARWENT ELLIS.